United States Patent
Kennedy et al.

[11] Patent Number: 6,147,831
[45] Date of Patent: Nov. 14, 2000

[54] SERVO TRACK WRITER HAVING A SERVO WRITER POSITIONING ARM WITH A VIBRATION DAMPER AND A METHOD OF MAKING A HEAD DISK ASSEMBLY

[75] Inventors: Michael John Kennedy, Los Gatos; James Benning, Rancho Santa Margarita; Martin J. McCaslin, Pleasanton, all of Calif.; Mark G. Dube, Cannon Falls, Minn.

[73] Assignee: Western Digital Corporation, Irvine, Calif.

[21] Appl. No.: 09/100,197

[22] Filed: Jun. 18, 1998

[51] Int. Cl.[7] .................................................. G11B 21/08
[52] U.S. Cl. ............................................. 360/75; 360/106
[58] Field of Search .............................. 360/75, 104, 106, 360/109

[56] References Cited

U.S. PATENT DOCUMENTS

| | | |
|---|---|---|
| 3,875,589 | 4/1975 | Applequist et al. |
| 4,933,792 | 6/1990 | Sleger et al. ............................ 360/106 |
| 4,980,783 | 12/1990 | Moir et al. |
| 5,774,294 | 6/1998 | Fioravanti ................................. 360/75 |

*Primary Examiner*—Paul Loomis
*Assistant Examiner*—James L Habermehl
*Attorney, Agent, or Firm*—Milad G. Shara

[57] ABSTRACT

A servo track writer for a head disk assembly and a method of making the head disk assembly using the servo track writer are disclosed. The head disk assembly includes an enclosure having an opening and a base and an actuator arm coupled to the base and having a servo writer positioning arm facing surface. The servo track writer includes a platform for supporting the head disk assembly. The platform includes a base portion, a column extending substantially perpendicular to the base portion, and an elongated servo writer positioning arm for protruding through the opening and supported by the column. The positioning arm includes a main body, a tip having an actuator arm facing surface for abutting the positioning arm facing surface, and a vibration damper positioned between the main body and the tip. The vibration damper damps vibrations induced in the actuator arm by dissipating energy transferred between the platform and the actuator arm.

13 Claims, 6 Drawing Sheets

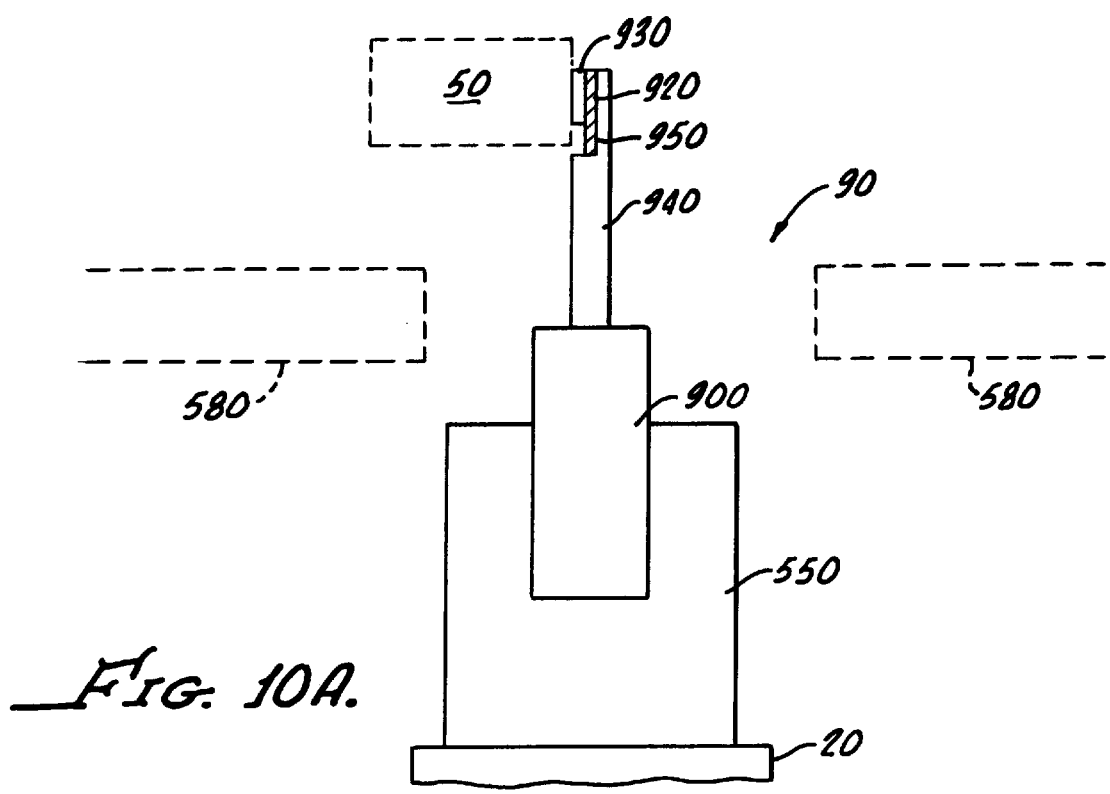
_Fig. 10A._
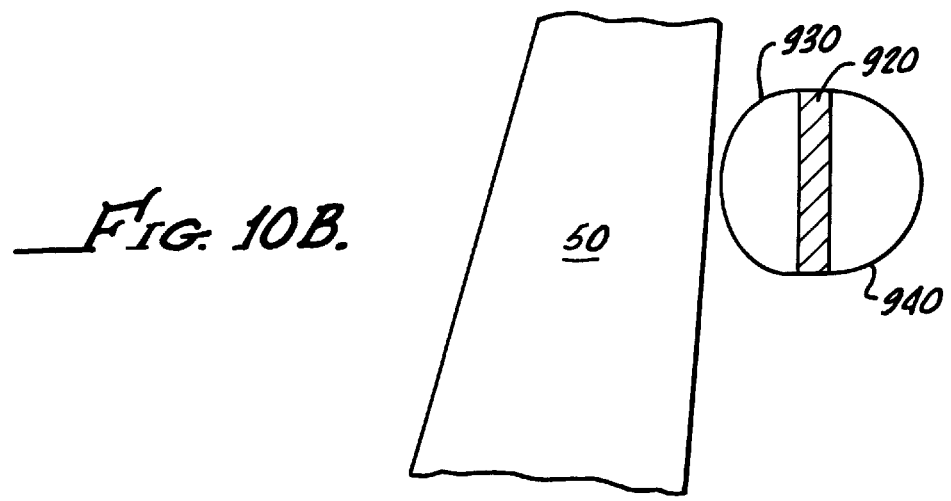
_Fig. 10B._

SERVO TRACK WRITER HAVING A SERVO WRITER POSITIONING ARM WITH A VIBRATION DAMPER AND A METHOD OF MAKING A HEAD DISK ASSEMBLY

BACKGROUND OF THE INVENTION

1. Field of the Invention

This invention relates to a servo track writer for a head disk assembly and a method of making the head disk assembly using the servo track writer.

2. Description of the Prior Art and Related Information

With reference to FIGS. 1A and 1B, a prior art servo track writer 100 is shown which includes a supporting block 102 for supporting a plurality of head disk assemblies (not shown), e.g. four head disk assemblies, and a platform ("bell housing") 32. In the course of making a head disk assembly (HDA), servo track writer 100 is used to write servo information on a recording surface of a disk within the HDA. Supporting block 102 includes apertures 104. Platform 32 includes a base portion 30 and a plurality of columns ("necks") 20. Servo track writer 100 further includes a plurality of servo writer positioning arms 10, each positioning arm extending through a respective aperture 104 and associated with a respective HDA.

A typical head disk assembly includes an enclosure having a base and a cover, a spindle motor attached to the base, a disk mounted on the spindle motor, and a head stack assembly coupled to the base. The head stack assembly includes a plurality of actuator arms including a bottom arm and a head gimbal assembly attached to each actuator arm. Each head gimbal assembly includes a load beam and a head coupled to the load beam.

In operation, four head disk assemblies are secured on supporting block 102 in order to write servo information simultaneously on each disk of the head disk assemblies. Control circuitry (not shown) of servo writer 100 controls the spin rate of each disk via a spindle motor (not shown) and each positioning arm 10 is moved simultaneously in a counter-clockwise direction through an opening in the enclosure such as a side opening defined by the side walls of the base and cover. Each head stack assembly is moved towards an area of the disk proximate an outer diameter of the disk such that a bottom actuator arm 50 is biased against the positioning arm as shown in FIG. 1C. While bottom actuator arm 50 is biased against positioning arm 10, the positioning arm is moved in the counter-clockwise direction such that writing of servo information can occur on each recording surface of each disk ("servo writing process").

During the servo writing process, the disks are rotated at a relatively high speed, such as 5400 revolutions per minute (rpm), which generates a large degree of air turbulence inside an HDA. Such air turbulence causes both the positioning arm 10 and the actuator arms to vibrate since bottom actuator arm 50 is abutting positioning arm 10.

The vibrations lead to several problems during the servo writing process. First, the vibrations of positioning arm 10 may cause platform 32 to vibrate at a frequency at or near a resonant frequency of the platform which may adversely affect the servo control of positioning arm 10. Another problem resulting from the vibrations is that because the actuator arms are vibrating during the servo writing process, the servo information may not be written as concentric tracks on a recording surface. Rather, the written tracks may have high frequency sinusoidal vibration displacements superimposed on the track profile, resulting in a written-in or repeatable run-out (RRO) of the tracks. Such run-out results in a decrease in HDA yields and/or will limit the number of tracks that can be written on the recording surface decreasing the storage capacity.

With reference to FIG. 2, the vibrations of a prior art servo writer positioning arm as a function of frequency are shown. The vibrations were measured with an accelerometer mounted on a back side of the positioning arm such as the one shown in FIG. 1C. Since the positioning arm is abutting an actuator arm such as bottom actuator arm 50 shown in FIG. 1C, the vibrations of the actuator arm are substantially the same. As shown, at particular frequencies, the magnitude of the vibrations induced in the actuator arm is relatively large which leads to the problems described above.

SUMMARY OF THE INVENTION

This invention can be regarded as a method of making a head disk assembly using a servo track writer. The head disk assembly includes an enclosure having an opening and a base, an actuator arm coupled to the base and having a servo writer positioning arm facing surface, and a disk coupled to the base and having a recording surface. The servo track writer includes a platform for supporting the head disk assembly, a servo writer positioning arm coupled to the platform, the positioning arm including a main body, a tip having an actuator arm facing surface, and a vibration damper positioned between the main body and the tip.

The method includes the steps of providing the positioning arm through the opening and rotating the disk. While the disk is rotating, the method further includes the steps of positioning the actuator arm over the recording surface, biasing the actuator arm against the tip such that the positioning arm facing surface abuts the arm facing surface; and while the actuator arm is biased against the tip, damping vibrations induced in the actuator arm by way of the vibration damper dissipating energy transferred between the platform and the actuator arm.

This invention can also be regarded as a servo track writer for a head disk assembly. The head disk assembly includes an enclosure having an opening and a base and an actuator arm coupled to the base and having a servo writer positioning arm facing surface. The servo track writer includes a platform for supporting the head disk assembly. The platform includes a base portion, a column extending substantially perpendicular to the base portion, and an elongated servo writer positioning arm for protruding through the opening and supported by the column. The positioning arm includes a main body, a tip having an actuator arm facing surface for abutting the positioning arm facing surface, and a vibration damper positioned between the main body and the tip. The vibration damper damps vibrations induced in the actuator arm by dissipating energy transferred between the platform and the actuator arm.

BRIEF DESCRIPTION OF THE DRAWINGS

FIG. 10A is a cross sectional view of a portion of a servo track writer and a head disk assembly according to a fifth embodiment of this invention;

FIG. 10B is a plan view of a portion of FIG. 10A; and

DETAILED DESCRIPTION OF PREFERRED EMBODIMENTS

Figure 1A:
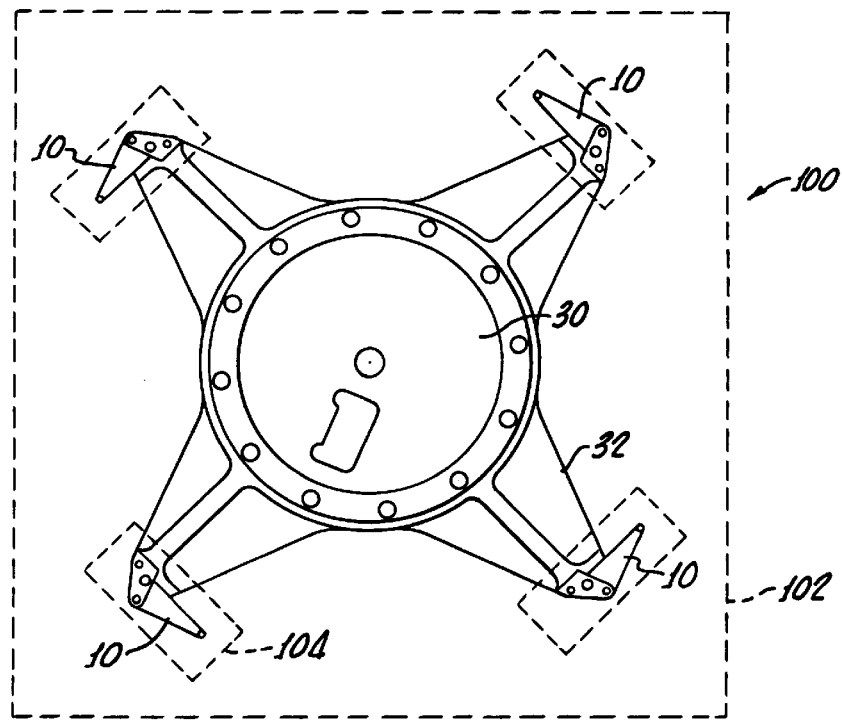
FIG. 1A is a plan view of a prior art servo track writer.
Figure 1B:
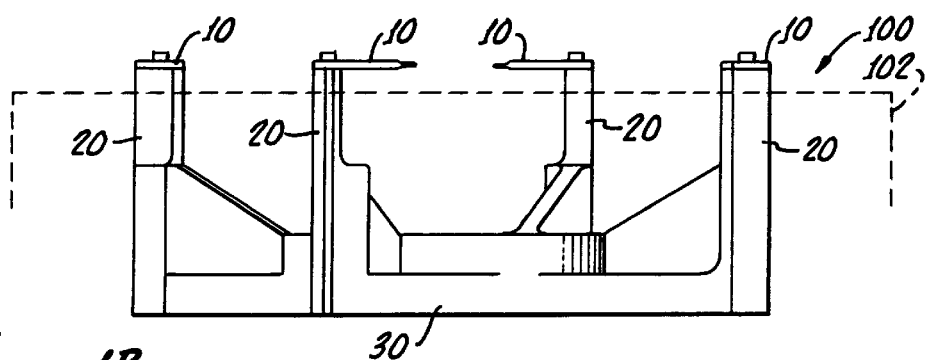
FIG. 1B is a side view of FIG. 1A.
Figure 1C:
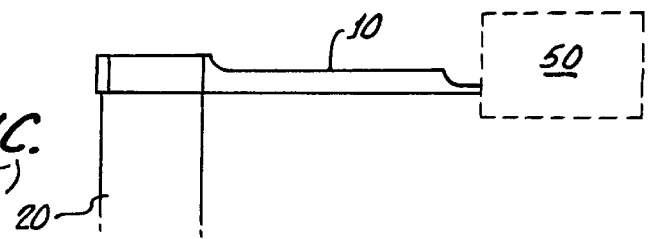
FIG. 1C shows a portion of FIG. 1B in which a servo writer positioning arm abuts an actuator arm.
Figure 3:
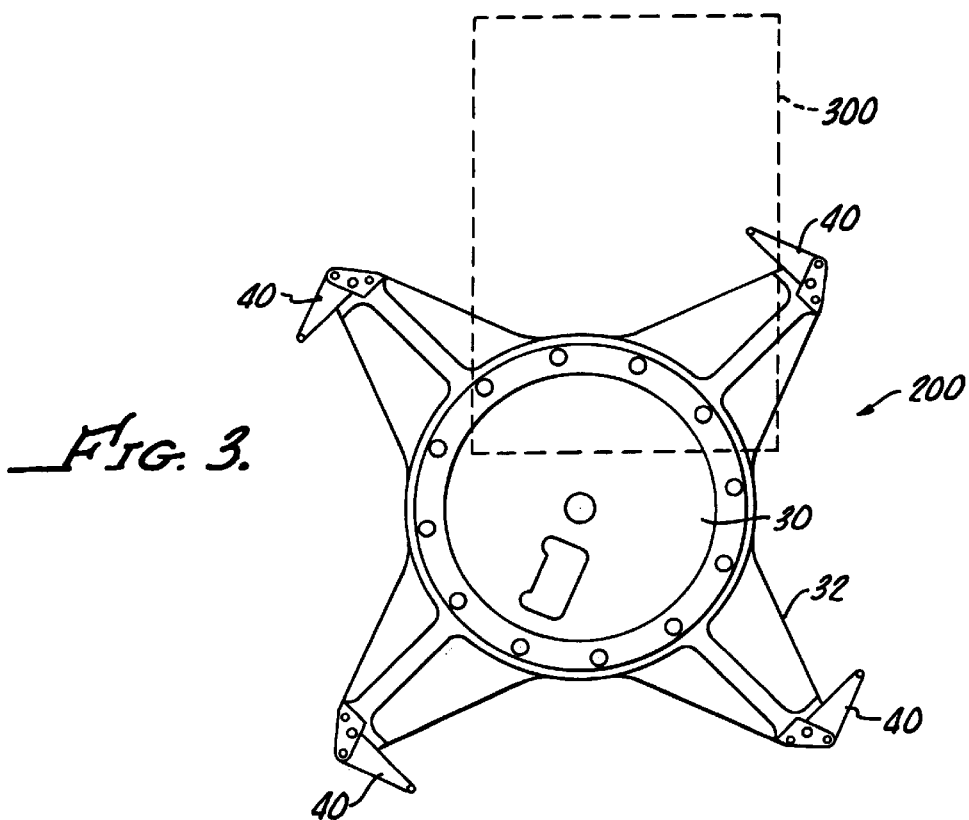
FIG. 3 is a plan view of a servo track writer according to this invention in which a head disk assembly is shown mounted on the servo track writer.

With reference to FIG. 3, a servo track writer 200 according to this invention is shown which includes a platform 32. Platform 32 couples to an HDA 300 via a supporting block (not shown) which is suitably made from granite. The supporting block has a relatively large mass and is used to sufficiently secure HDA 300 and to isolate the HDA from outside vibrations during the servo writing process. Outside vibrations may include vibrations originating outside of a cleanroom in which the servo writing takes place. Platform 32 includes a base portion 30 and columns 20 (see FIG. 4), each of which extends in a direction substantially perpendicular to base portion 30. Servo track writer 200 further includes elongated servo writer positioning arms 40 ("push knife"), each of which is supported by a column and protrudes through an opening (see FIG. 4) in the HDA. During the servo writing process, each positioning arm 40 rotates suitably in a counter-clockwise direction via a corresponding aperture (not shown) in the supporting block. Significantly, each positioning arm 40 includes a vibration damper for damping vibrations induced in the actuator arms (not shown) inside the HDA to be described with reference to the following preferred embodiments.

Figure 4:
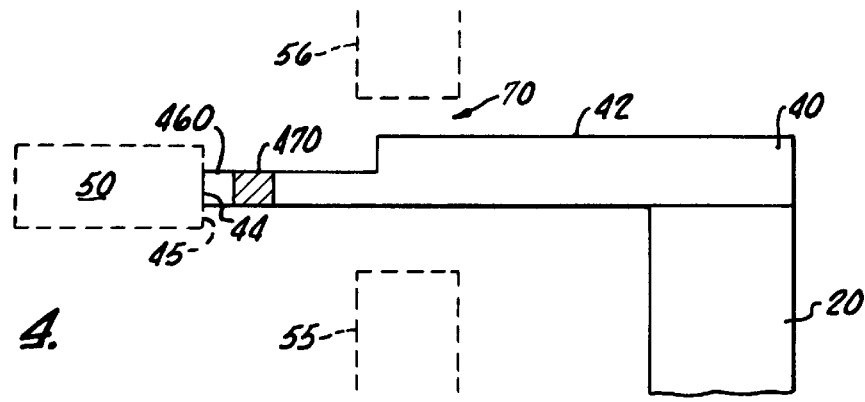
FIG. 4 is a cross sectional view of a portion of FIG. 3 according to a first embodiment of this invention.

With reference to FIG. 4, positioning arm 40 supported by column 20 protrudes through an opening 70 defined by an enclosure of the HDA 300. Opening 70 is a side opening defined by vertical walls of a base 55 and a cover 56 of the enclosure. Positioning arm 40 includes a main body 42, a vibration damper 470 in compression, and a tip 460 which includes an actuator arm facing surface 44. Actuator arm facing surface 44 abuts a servo writer positioning arm facing surface 45 of an actuator arm, such as a bottom actuator arm 50 or any actuator arm in the stack. In operation, a head stack assembly (not shown) having a plurality of actuator arms which includes bottom actuator arm 50 is biased against positioning arm 40 such that bottom actuator arm 50 is proximate an outer diameter of a rapidly rotating disk. Positioning arm 40 is used to move actuator arm 50 radially towards an inner diameter of the disk thereby moving the entire head stack assembly. In the course of moving actuator arm 40 radially inward, servo information is written on a recording surface of each disk in substantially concentric tracks. The rapidly rotating disks generate a substantial amount of air turbulence inside the HDA which causes both actuator arm 50 and positioning arm 40 to vibrate during the servo writing process. However, because vibration damper 470 is positioned between main body 42 and tip 460, vibration damper 470 damps vibrations induced in actuator arm 50 as well as the other actuator arms of the head stack assembly by dissipating energy transferred between platform 32 (FIG. 3) and actuator arm 50. Hence, vibrations in the actuator arms are reduced and the vibrations induced in the platform are relatively minor such that the positioning of the actuator arms by the servo track writer is not adversely affected.

Figure 5:
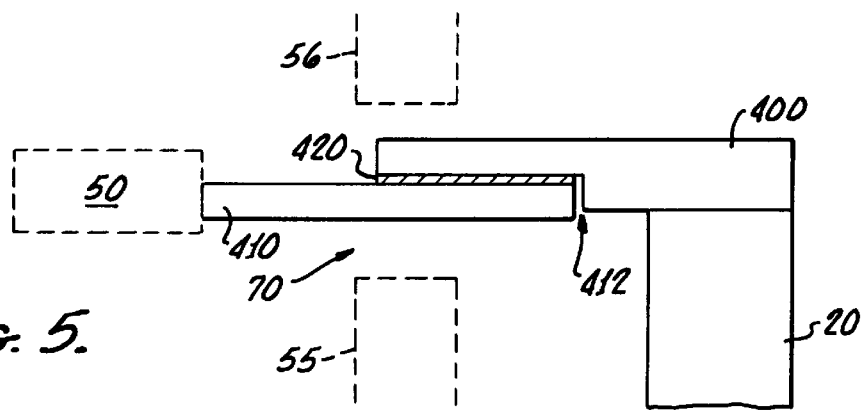
FIG. 5 is a cross sectional view of a portion of a servo track writer and a head disk assembly according to a second embodiment of this invention.

With reference to FIG. 5, a positioning arm includes main body 400, a vibration damper 420 in shear, and a tip 410 for abutting bottom actuator arm 50. The positioning arm is supported by column 20 and protrudes through opening 70 defined by the side walls of base 55 and cover 56 as in FIG. 4. Main body 400 includes a recess 412 which defines a location for vibration damper 420.

Figure 6:
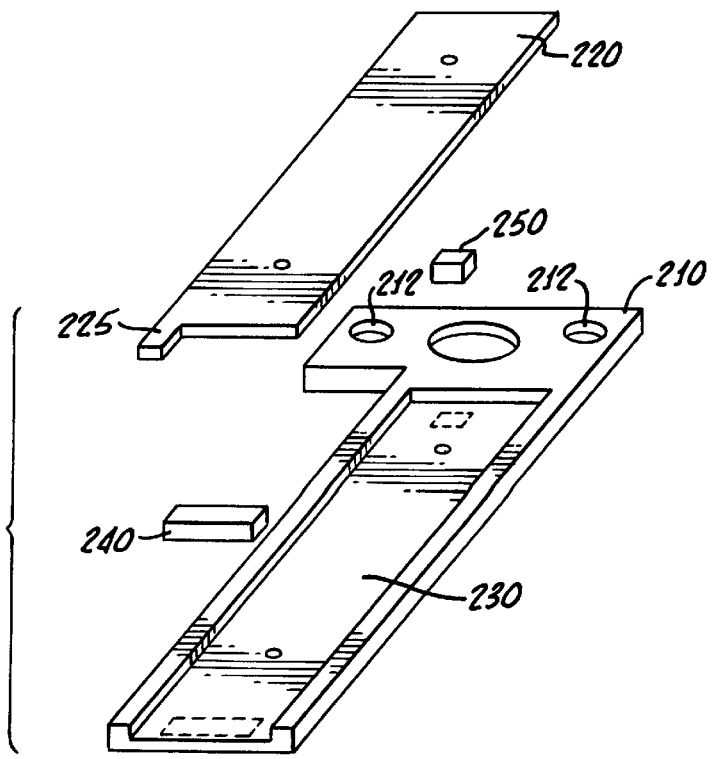
FIG. 6 is an exploded view of a servo writer positioning arm of this invention.

With reference to FIG. 6, a positioning arm is shown which includes components prior to assembly. The positioning arm includes an upper panel defining a main body 220 and a tip 225, a bottom panel 210 defining a recess 230, a vibration damper 240, and another damper 250. The upper panel, and the two dampers are securely positioned in recess 230. A suitable bonding means such as an adhesive is applied to the top and bottom surfaces of dampers 240 and 250 to securely attach each damper to the panels. The positioning arm, once assembled, is attached to a column with fasteners such as screws via holes 212.

Figure 7:
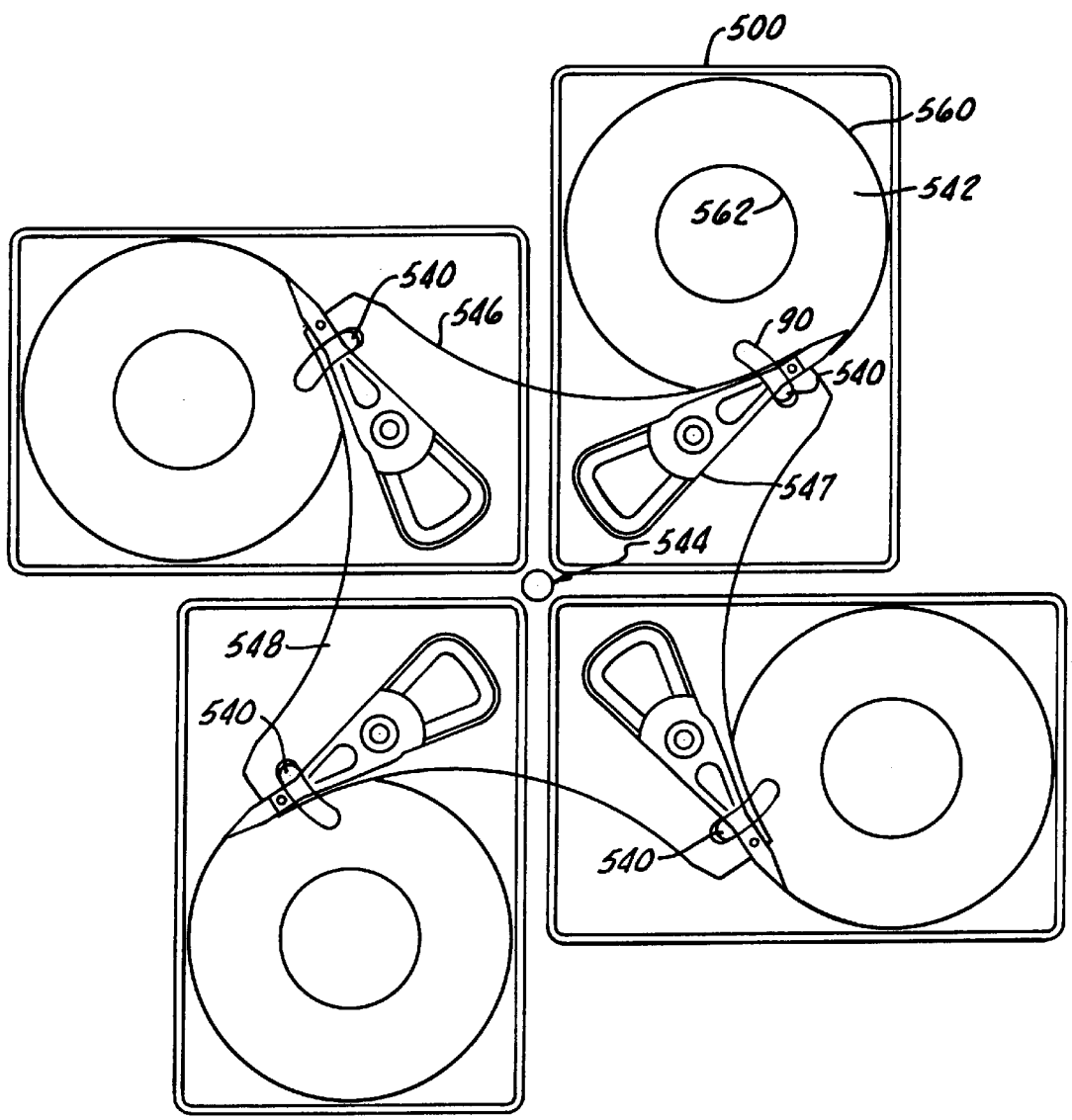
FIG. 7 is a plan view of a servo track writer according to this invention in which a plurality of head disk assemblies are shown mounted on the servo track writer.

With reference to FIGS. 7–10B, another set of embodiments are shown which includes a positioning arm embodying a structure known as a "push-pin" positioning arm. In particular, with reference to FIG. 7, a servo track writer includes a platform 546 having a base portion 548. Platform 546 includes a hole 544 defining a longitudinal axis of rotation for the platform. A supporting block (not shown) supports each HDA 500. HDA 500 includes a bottom opening 90 defined by a base 580 of the HDA. HDA 500 further includes a head stack assembly 547 which is coupled to the base and which includes a plurality of actuator arms having a bottom actuator arm for abutting a positioning arm 540 of the servo track writer. As shown in FIG. 7, the actuator arms are positioned proximate an outer diameter 560 of a disk 542 at the beginning of the servo writing process. In an alternative embodiment, the actuator arms may be positioned proximate an inner diameter 562 of the disk at the beginning of the servo writing process and then moved radially towards outer diameter 560. The disks are rotated by a corresponding spindle motor (not shown).

With reference to FIGS. 8–10B, positioning arm 540 includes a main body 550 supported by a column 20, a tip (530, 640, 930), and a vibration damper (520, 620, 920) positioned between the tip and the main body. Each tip includes an actuator arm facing surface 533 for abutting a servo writer positioning arm facing surface 532 of an actuator arm such as bottom actuator arm 50.

Figure 8:
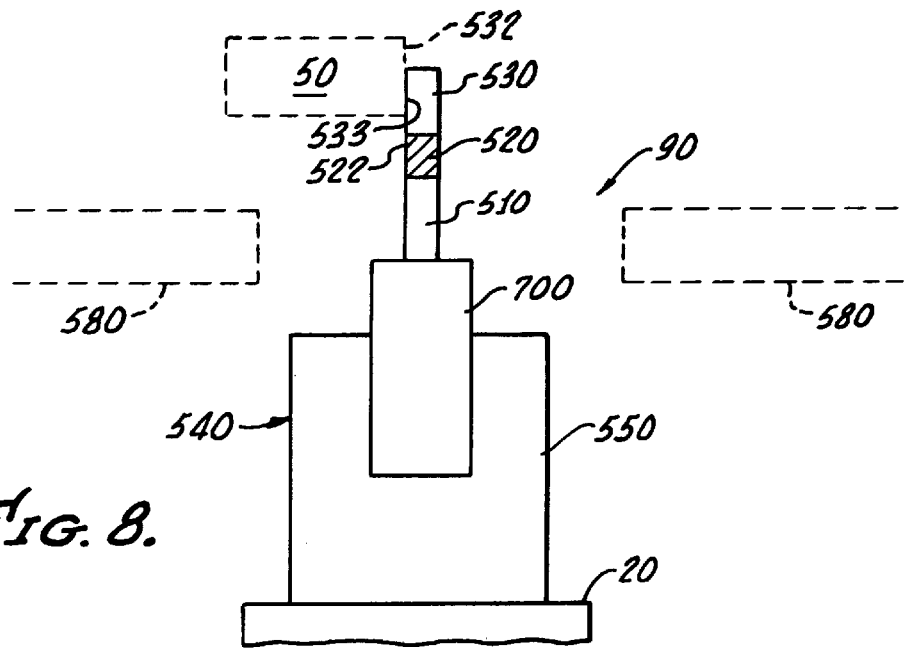
FIG. 8 is a cross sectional view of a portion of a servo track writer and a head disk assembly according to a third embodiment of this invention.
Figure 9:
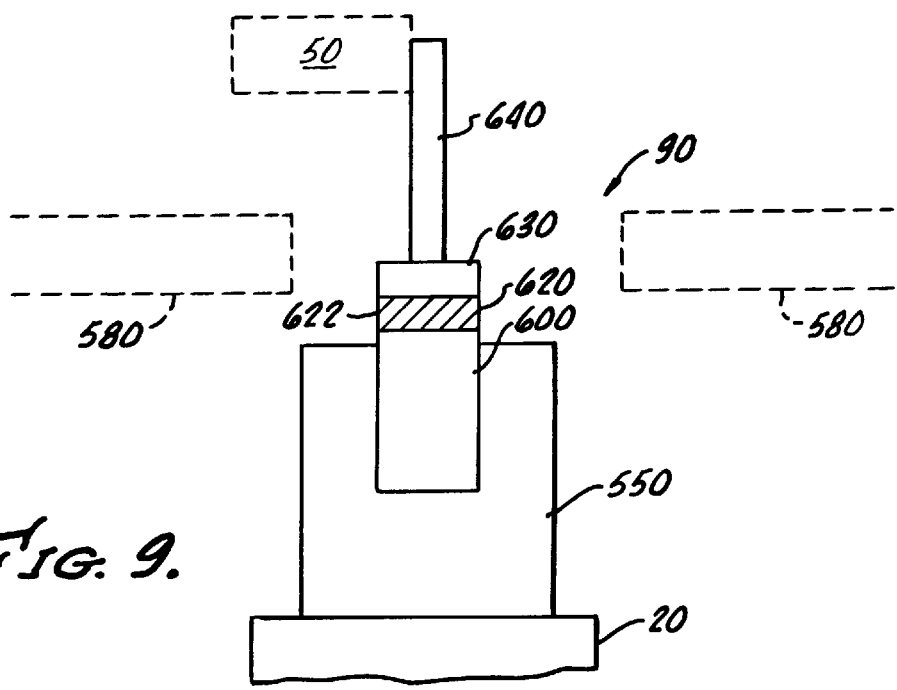
FIG. 9 is a cross sectional view of a portion of a servo track writer and a head disk assembly according to a fourth embodiment of this invention.

The embodiments shown in FIGS. 8 and 9 depict a vibration damper in shear and bending between the tip and the main body while the embodiment shown in FIG. 10A depicts a vibration damper in compression.

In FIGS. 8 and 9, each positioning arm includes a cylindrical member (700, 600) for coupling to the vibration damper and each vibration damper is coaxial with the tip and main body and includes an outer cylindrical surface (522, 622). In FIG. 8, another cylindrical member 510 is between vibration damper 520 and member 700 while in FIG. 9, a member 630 is between tip 640 and vibration damper 620. Furthermore, in FIG. 8, cylindrically shaped tip 530 has a first diameter which is substantially the same as the diameter ("second diameter") of cylindrically shaped vibration damper 520 while in FIG. 9, the diameter of vibration damper 620 is greater than the diameter of tip 640.

With reference to FIGS. 10A–10B, positioning arm 540 further includes an elongated member 940 having a recess 950 for supporting vibration damper 920. As shown in FIG. 10A, the vibration damper is in compression and tip 930 defines a semi-cylindrically shaped outer surface ("actuator arm facing surface") for abutting actuator arm 50.

Figure 2:
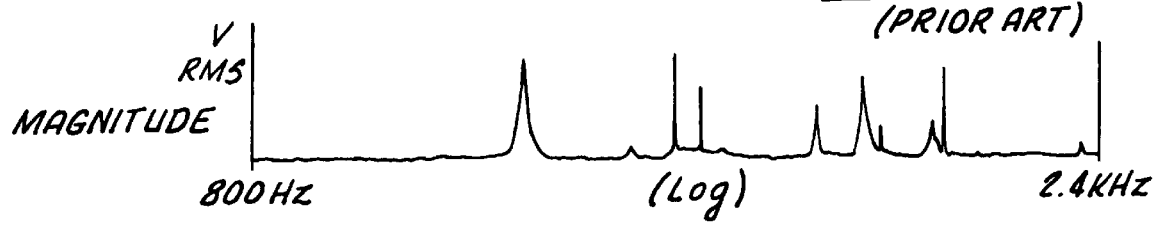
FIGS. 2 is a graph of the magnitude of vibrations of a servo writer positioning arm as a function of frequency according to the prior art when the prior art servo track writer is in operation.
Figure 11:
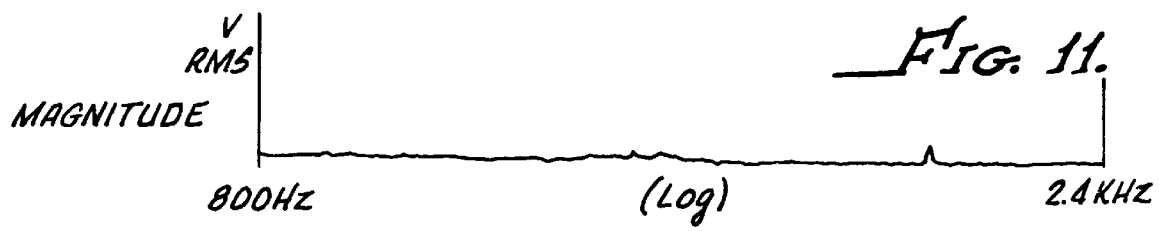
FIG. 11 is a graph of the magnitude of vibrations of a damped servo writer positioning arm as a function of frequency according to this invention when the servo track writer of this invention is in operation.

Significantly, the vibration damper of this invention damps vibrations induced in an actuator arm as represented by FIG. 11. FIG. 11 shows the vibrations of a servo writer positioning arm of this invention as a function of frequency where the vibrations were measured with an accelerometer as in the prior art. Hence, the vibrations of an actuator arm are substantially the same. As shown, at particular frequencies, the magnitude of vibrations induced in the actuator arm during the servo writing process is significantly lower as compared to the prior art graph shown in FIG. 2. Such a reduction in the magnitude of vibrations results in a decrease in repeatable run-out which leads to an increase in HDA yields and/or storage capacity. Furthermore, the servo control of the positioning arms is less likely to be affected since the vibration interaction between the actuator arm and the platform of the servo track writer is reduced.

Suitably, the positioning arms may be made from metal such as aluminum or stainless steel with the exception of the vibration damper. In a preferred embodiment, the vibration damper may be made from urethane with a durometer range between about 40 to 60 durometers or an EAR ISODAMP vinyl material having a similar durometer range. An epoxy material, such as 3M NPE-3205, may be used to bond the vibration damper to corresponding bonding surfaces in each positioning arm. The vibration damper is of a sufficient thickness and surface area to dissipate energy transferred between the platform and the actuator arm. For example, in FIG. 9, the thickness of vibration damper in the axial direction is about 1.0 mm (0.015 inch), and the cylindrically shaped vibration damper has a diameter of about one inch. While in the preferred embodiments, a servo track writer having four servo writer positioning arms are shown for simultaneously servo writing four HDAs, this invention is applicable to other types of servo track writers such as one having a single servo writer positioning arm for servo writing an HDA.

We claim:

1. A method of making a head disk assembly using a servo track writer, the head disk assembly including an enclosure having an opening and a base, an actuator arm coupled to the base and having a servo writer positioning arm facing surface, a disk coupled to the base and having a recording surface, the servo track writer including a platform for coupling to the head disk assembly, a servo writer positioning arm coupled to the platform, the positioning arm including a main body, a tip having an actuator arm facing surface, and a vibration damper positioned between the main body and the tip, the method comprising the steps of:

providing the positioning arm through the opening;

rotating the disk; and while the disk is rotating:

positioning the actuator arm over the recording surface;

biasing the actuator arm against the tip such that the positioning arm facing surface abuts the arm facing surface; and while the actuator arm is biased against the tip:

damping vibrations induced in the actuator arm by way of the vibration damper dissipating energy transferred between the platform and the actuator arm.

2. The method of claim 1 wherein the damper is in compression between the main body and the tip.

3. The method of claim 1 wherein the damper is in shear between the main body and the tip.

4. The method of claim 1 wherein the step of positioning the actuator arm includes:

positioning the actuator arm proximate an outer diameter of the disk.

5. The method of claim 4 further comprising the step of:

moving the actuator arm towards an inner diameter of the disk.

6. A servo track writer for a head disk assembly, the head disk assembly including an enclosure having an opening and a base, an actuator arm coupled to the base and having a servo writer positioning arm facing surface, the servo track writer comprising:

a platform for coupling to the head disk assembly;

the platform including:

a base portion;

a column extending substantially perpendicular to the base portion;

an elongated servo writer positioning arm for protruding through the opening and supported by the column;

the positioning arm including:

a main body;

a tip having an actuator arm facing surface, the actuator arm facing surface for abutting the positioning arm facing surface; and a vibration damper positioned between the main body and the tip, the vibration damper for damping vibrations induced in the actuator arm by dissipating energy transferred between the platform and the actuator arm.

7. The servo track writer of claim 6 wherein the damper is in compression between the main body and the tip.

8. The servo track writer of claim 7 wherein the main body has a recess and the damper is positioned between the recess and the tip.

9. The servo track writer of claim 6 wherein the damper is in shear between the main body and the tip.

10. The servo track writer of claim 9 wherein the damper includes an outer cylindrical surface.

11. The servo track writer of claim 10 wherein the tip has a first diameter and the damper has a second diameter, the second diameter being substantially the same as the first diameter.

12. The servo track writer of claim 10 wherein the tip has a first diameter and the damper has a second diameter which is greater than the first diameter.

13. The servo track writer of claim 10 wherein the damper is coaxial with the tip and the main body.

* * * * *